(12) United States Patent
Lievestro et al.

(10) Patent No.: US 9,033,420 B2
(45) Date of Patent: May 19, 2015

(54) SEAT CUSHION, FOR INSTANCE FOR AN AIRCRAFT SEAT, AND A METHOD FOR MANUFACTURING SUCH A SEAT CUSHION

(75) Inventors: Robert Lievestro, Elst (NL); Johannes Van Blitterswijk, Oosterhout (NL)

(73) Assignee: RECTICEL HOLDING NOORD B.V., Kesteren (NL)

( * ) Notice: Subject to any disclaimer, the term of this patent is extended or adjusted under 35 U.S.C. 154(b) by 170 days.

(21) Appl. No.: 13/436,729

(22) Filed: Mar. 30, 2012

(65) Prior Publication Data

US 2012/0256466 A1 Oct. 11, 2012

(51) Int. Cl.
| | |
|---|---|
| *A47C 27/16* | (2006.01) |
| *A47C 27/15* | (2006.01) |
| *A47C 31/00* | (2006.01) |
| *B60N 2/68* | (2006.01) |
| *B60N 2/70* | (2006.01) |
| *B64D 11/06* | (2006.01) |
| *B29C 44/12* | (2006.01) |
| *B29L 31/58* | (2006.01) |
| *B29K 105/04* | (2006.01) |
| *B29K 105/16* | (2006.01) |

(Continued)

(52) U.S. Cl.
CPC ............... *A47C 27/16* (2013.01); *A47C 27/15* (2013.01); *A47C 31/001* (2013.01); *B60N 2/682* (2013.01); *B60N 2/686* (2013.01); *B60N 2/7017* (2013.01); *B64D 11/06* (2013.01); *Y02T 50/46* (2013.01); *B64D 11/0647* (2014.12); *B29K 2995/0016* (2013.01); *B29K 2995/0063* (2013.01); *B29L 2031/58* (2013.01); *B29K 2105/048* (2013.01); *B29K 2105/165* (2013.01); *B29K 2023/12* (2013.01); *B29K 2075/00* (2013.01); *B29C 44/1266* (2013.01)

(58) Field of Classification Search
CPC ........ A47C 7/18; A47C 27/15; A47C 27/148; A47C 7/20; B60N 2/7035; Y10S 5/911
USPC ............. 297/452.26, 452.27, 452.32, 452.35, 297/452.37
See application file for complete search history.

(56) References Cited

U.S. PATENT DOCUMENTS

| | | | |
|---|---|---|---|
| 3,477,967 A | 11/1969 | Resnick | |
| 5,837,739 A | 11/1998 | Nowak et al. | |
| 6,214,896 B1 * | 4/2001 | Mogami et al. | ............... 521/58 |

(Continued)

FOREIGN PATENT DOCUMENTS

| | | |
|---|---|---|
| DE | 38 06 207 | 9/1989 |
| JP | 2008-138020 | 6/2008 |

(Continued)

OTHER PUBLICATIONS

Rek, Vesna, "Dynamic mechanical study of thermoplastic polyurethane/polypropylene blends," Nov. 17, 2004.*

(Continued)

*Primary Examiner* — Sarah B McPartlin
(74) *Attorney, Agent, or Firm* — Morrison & Foerster LLP

(57) ABSTRACT

A seat cushion, in particular for an aircraft seat, the seat cushion comprising a seat part having a receiving surface adapted to receive a person and a reinforcing part supporting the seat part, wherein at least the reinforcing part contains expanded polypropylene (EPP), preferably comprising fire retardant properties. The invention further relates to a method for manufacturing such a seat cushion, a seat comprising such a seat cushion and a vehicle comprising such a seat.

17 Claims, 2 Drawing Sheets

(51) Int. Cl.
  *B29K 23/00* (2006.01)
  *B29K 75/00* (2006.01)

(56) References Cited

U.S. PATENT DOCUMENTS

| | | | |
|---|---|---|---|
| 6,358,459 B1 * | 3/2002 | Ziegler et al. | 264/413 |
| 6,550,858 B1 | 4/2003 | Grohs et al. | |
| 7,201,625 B2 * | 4/2007 | Yeh | 441/65 |
| 2004/0169361 A1 * | 9/2004 | Lewis | 280/748 |
| 2008/0047071 A1 | 2/2008 | Christofferson et al. | |
| 2009/0146472 A1 | 6/2009 | Galbreath et al. | |
| 2011/0018329 A1 | 1/2011 | Galbreath et al. | |
| 2012/0187739 A1 * | 7/2012 | Folkert et al. | 297/452.18 |

FOREIGN PATENT DOCUMENTS

| | | |
|---|---|---|
| WO | WO-2006/102969 | 10/2006 |
| WO | WO-2008/103088 | 8/2008 |
| WO | WO-2010/113471 | 10/2010 |

OTHER PUBLICATIONS

Search Report and Written Opinion for NL 2006524, dated Nov. 21, 2011.

Search Report and Written Opinion for NL 2006525, dated Nov. 23, 2011.

* cited by examiner

SEAT CUSHION, FOR INSTANCE FOR AN AIRCRAFT SEAT, AND A METHOD FOR MANUFACTURING SUCH A SEAT CUSHION

CROSS-REFERENCE TO RELATED APPLICATIONS

This application claims priority from Netherlands applications NL 2006525 filed 1 Apr. 2011 and NL 2006524 filed 1 Apr. 2011. The disclosures of these applications are herein incorporated by reference in their entirety.

TECHNICAL FIELD

The invention relates to seat cushions, particularly for aircraft.

DISCLOSURE OF THE INVENTION

The invention relates to a seat cushion, in particular for an aircraft seat, the seat cushion comprising a seat part having a receiving surface adapted to receive a user and a reinforcing part supporting the seat part.

Such seat cushions are known from practice and are for instance provided in a vehicle seat such as a seat for an aircraft. Since a seat provided with such a seat cushion may be occupied by a person for an amount of hours in a row, it is desired that the seat is comfortable. Therefore, such seat cushions may be provided with a resilient body, for instance of polyurethane and can comprise a covering of a fabric. At the same time, the seat cushion has to have a certain strength to be durable, and if necessary, to persist certain impacts. The cushion may therefore comprise a reinforcing structure such as a reinforcing core or a support frame or the like. A drawback of such seat cushions is that these are relatively heavy, which is undesired especially when used in an airplane.

Therefore, the present invention aims to provide an improved seat cushion for a vehicle seat, in particular for an aircraft. More in particular, the invention contemplates a seat cushion with improved characteristics, especially with a reduced weight while at least maintaining or improving other properties such as comfort and impact resistance.

To that end a seat cushion according to the invention is characterized in that the at least the reinforcing part contains expanded polypropylene (EPP) comprising fire retardant properties.

Because integrating fire retardant properties into polypropylene raw material has become possible recently, expanded polypropylene manufactured from said raw material may be used to advantage in a seat cushion, especially when used in an aircraft. Since the expanded polypropylene used comprises improved fire retardant properties, it may be used for products and in locations where strict regulations concerning flammability apply. Furthermore, expanded polypropylene has a relatively low density and provides for a relatively light weight reinforcing part and thus for a relatively light weight seat cushion, especially when compared to the known aircraft seat cushion as described before. When only the seat part will be manufactured from a material such as polyurethane and the reinforcing part will be manufactured from expanded polypropylene instead of from polyurethane, the weight will reduce due to the lower density of expanded polypropylene with respect to the density of polyurethane. At the same time, the seat cushion will have increased impact absorption characteristics, because of the increased impact absorption properties of the reinforcing part of expanded polypropylene. Besides, due to said improved impact absorption characteristics, the cushion gives a reduced spine load in acceleration tests such as 14 G and 16 G tests. Since the expanded polypropylene comprises increased fire retardant properties, this can be used to advantage in a seat cushion for an aircraft as mentioned before. After all, seat cushions that are used in an aircraft do have to comply with strict regulations, for instance concerning flammability. In case of a fire inside the aircraft, the seat cushions have to have a high fire resistance in order to prevent the fire from spreading in a quick manner inside the aircraft. In different words, when an aircraft seat is subjected to intense heat or to direct contact with fire, the seat and thus also the seat cushion may not catch fire immediately. When the seat cushion catches fire and the fire is removed, the seat cushion has to self-extinguish the fire or at least be fire retardant.

A further advantage of a seat cushion comprising a reinforcing part containing expanded polypropylene is that it can be recycled. By providing the reinforcing part as a separate part, at least the reinforcing part may be recycled completely.

It is noted that the seat cushion may be used as a sitting cushion, as a back cushion, in a headrest, in foot stools and the like.

In further elaboration of the invention, the reinforcing part may be a discrete element, comprising said expanded polypropylene or consisting of said expanded polypropylene. For instance, by molding the reinforcing part out of expanded polypropylene, difficult shapes of the reinforcing part and thus of the receiving surface seat cushion may be easily obtained. This enables manufacturing of seat cushions with improved ergonomic qualities, thus an enhanced seating comfort. Due to the improved ergonomic properties of the expanded polypropylene the thickness of the seat part may be limited. Consequently, the total weight of the seat cushion may be reduced. Preferably, the seat part covers an upper surface of the reinforcing part, at least partly, to provide the seat with a comfortable upper layer to enhance comfort during flying. For instance, the seat part may comprise a resilient layer comprising resilient material such as polyurethane (PU) foam, for instance high resilient PU foam or, graphite foam a textile or the like material.

Alternatively or additionally, the seat part may comprise a resilient layer formed by an air pillow or the like. The resilient layer may be provided on top of the reinforcing part but may also surround the side surfaces of the reinforcing part, for instance at least partly.

The seat part and the reinforcing part may be interconnected, for instance by means of an adhesive layer. Connecting the seat part to the reinforcing part by means of an adhesive provides for a solid seat cushion without risking the upper part coming off from the lower part of the seat cushion. Instead, the seat part and the reinforcing part may be removably interconnected, for instance by means of a Velcro connection or the seat part may only be positioned on top of the reinforcing part without any additional fastening means.

Furthermore, due to the relatively low density of the seat cushion, said cushion may be used as a floating device in case of an emergency, for instance when the aircraft lands on water.

In an alternative embodiment of the invention, the seat part and the reinforcing part may be integrally formed in a discrete element out of a base material that at least encloses expanded polypropylene particles comprising the fire retardant properties. Such a seat cushion may be manufactured with a limited amount of manufacturing process steps, thereby providing relatively fast manufacturing. Furthermore, this seat cushion containing expanded polypropylene particles has a relatively limited density such that also this embodiment of the seat cushion provides a desired floating capacity. Preferably, the base material may be a polyurethane foam, for instance high resiliency PU foam, graphite foam or the like.

The properties of the seat cushion may be further influenced by choosing appropriate dimensions of the particles. For instance, the particles may have a diameter of approximately 100 nanometer-15 mm, preferably between 2-5 mm, for instance 3-4 mm. Also the particle distribution in the base material may contribute to the properties of the foam element according to the invention. The particle distribution in the base material may be substantially homogenously. But alternatively, for instance, the particle distribution in the base material, seen in a cross sectional view, may vary from a first side of the element to a second, opposite side of said element.

Typically, the base material may comprise an amount of particles ranging from 1%-50% of the total amount of material of the foam element. Thus, the ratio particles with respect to base material may preferably be 1:1 at the most.

In further elaboration of the invention, the particles may have different shapes. For instance, the particles may be substantially spherically shaped, but may also have a substantially rectangular, cylindrical or even a random geometrical shape.

In order to further reduce the weight of the seat cushion, it may be very advantageous if the reinforcing part comprises at least one cavity, preferably extending from a surface of the reinforcing part that faces away from the seat part in a direction towards the seat part. For instance, the reinforcing part may comprise an array of cavities such that the weight of the reinforcing part is further reduced.

The invention further relates to a method for manufacturing an above mentioned and described seat cushion wherein the raw material comprises a base material and expanded polypropylene particles, wherein the base material and the particles are processed at the same time. Such a method provides for easy and simple manufacture of a seat cushion according to the invention. Furthermore, manufacturing costs may be relatively low, since manufacturing of the cushion according to the method of the invention demands less manufacturing process steps and less parts to be assembled.

The invention also relates to a seat, more in particular an aircraft seat with an above described seat cushion and to a vehicle, vessel and/or aircraft provided with such a seat. Such a seat and such a vehicle, vessel and/or aircraft provide similar advantages as mentioned with the seat cushion.

BRIEF DESCRIPTION OF THE DRAWINGS

Further advantageous embodiments of a seat cushion according to the invention are set forth in the dependent claims. To explain the invention, exemplary embodiments thereof will hereinafter be described with reference to the accompanying drawings, wherein:

MODES OF CARRYING OUT THE INVENTION

Figure 1:
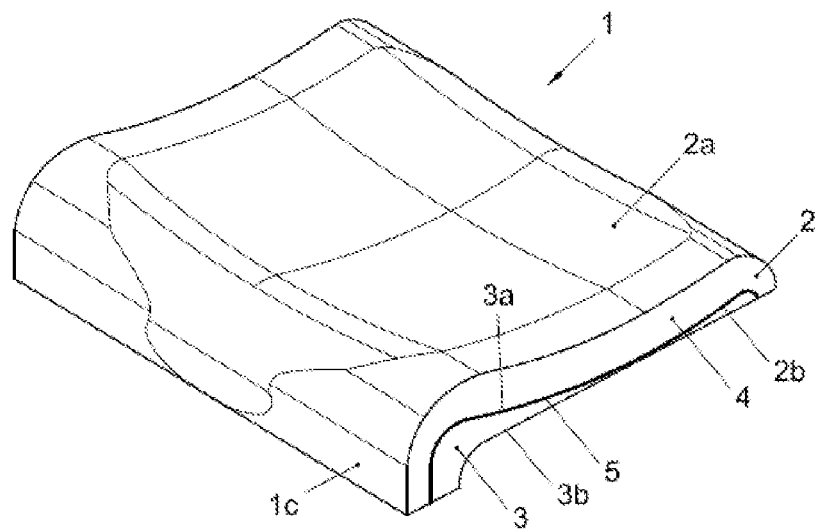
FIG. 1 schematically shows perspective view of first embodiment of a seat cushion according to the invention.

It is noted that identical or corresponding elements in the different drawings are indicated with identical or corresponding reference numerals.

Figure 2:
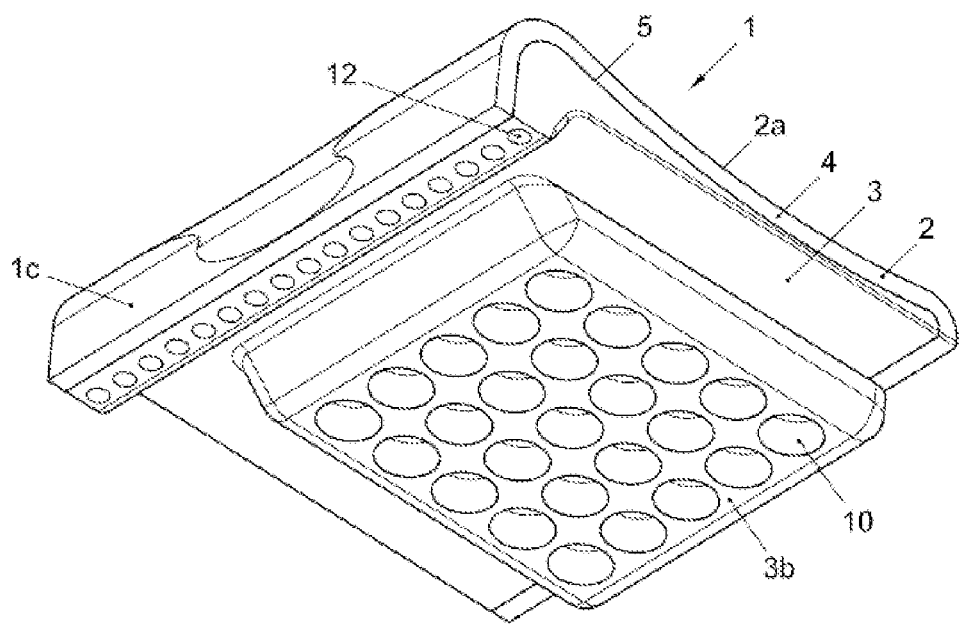
FIG. 2 schematically shows a further perspective view of the seat cushion of FIG. 1.
Figure 3:
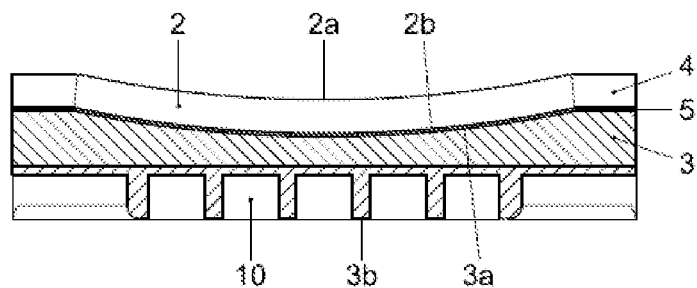
FIG. 3 schematically shows a cross sectional front view of the first embodiment of a seat cushion according to the invention.

In FIGS. 1-3, a first embodiment of the seat cushion 1 according to the invention is shown. The shown embodiment comprises a seat cushion 1 configured as a seating support. However, in an alternative embodiment (not shown), the seat cushion 1 may also be configured as a back cushion providing back support. The seat cushion 1 of FIG. 1 comprises a seat part 2 and a reinforcing part 3 supporting the seat part 2. The seat part 2 is adapted to receive a person. Therefore, the upper surface 2a, i.e., the surface 2a facing away from the reinforcing part 3, may have a curved shape that is adapted to the curves of a user to provide a comfortable seat. The reinforcing part 3 is providing the seat cushion 1 with a desired stability and impact absorbing capacity. According to the first embodiment of the seat cushion 1, the reinforcing part 3 comprises a molded element manufactured from expanded polypropylene (EPP) having fire retardant properties. The seat part 2 may comprise a resilient material such as a foamed polymer, such as polyurethane (PU) foam, such as high resilient PU foam, graphite foam, bonded foam, polyether foam or the like material.

The reinforcing part 3 of the seat cushion 1 may be manufactured by a molding process to form the reinforcing part 3 as a separate molded element out of EPP enabling a design of the cushion having difficult shapes. After molding the reinforcing part 3, a layer 4 of the resilient material, in the shown embodiment a layer of polyurethane foam may be provided at least at the upper surface 3a of the reinforcing part 3. Since the reinforcing part 3 is a molded product, the contours of the seat cushion 1 that are adapted to the body curves of a user may be easily provided. Therefore, the polyurethane layer 4 does not have to comprise complex shapes to provide an ergonomic seat cushion 1 and may comprise a relatively thin layer 4. The polyurethane foam layer 4 may be attached to the upper surface 3a of the reinforcing part 3 by means of an adhesive layer 5 (see also FIG. 3). Also other suitable adhesive means may be used. The adhesive layer 5 may be provided between the surfaces 2b, 3a of the respective parts 2, 3. The adhesive layer 5 may extend along the entire surfaces 2b, 3a, but may for instance only be provided around the perimeters of the surfaces 2b, 3a. The resilient layer 4 provides for a soft seating surface of the seat cushion 1 to enable comfortable sitting. The reinforcing part 3 provides stability to the seat cushion 1. Since the expanded polypropylene material of the reinforcing part 3 has a lower density than the polyurethane material of the seat part 2, the weight of the seat cushion 1 is relatively low compared to prior art seat cushions. To further limit the weight of the seat cushion it may be advantageous to provide the reinforcing part 3 of the seat cushion 1 with cavities 10, 12. Such cavities 10, 12 reduce the amount of material but do not weaken the strength and stability of the seat cushion 1. In the shown embodiment, the first cavities 10 are arranged in an array and extend from a lower surface 3b, i.e., the surface 3b of the reinforcing part 3 that faces away from the seat part 2, in a direction towards the seat part 2 and end at a short distance from the upper surface of the reinforcing part 3. Furthermore, second cavities 12 are arranged in a line that extends substantially parallel to a side surface 1c of the seat cushion 1 that in use faces the legs of a user. Of course, cavities may be provided on different locations of the reinforcing part 3, for instance dependent on the design and/or dimensions of the reinforcing part 3. Also the dimensions of the cavities 10, 12 may vary based on the design and/or shape of the reinforcing part 3 or of the seat cushion 1.

Due to the relative low density of the material of the reinforcing part 3, the seat cushion 1 may be used as a floating device, for instance in case of an emergency landing. Furthermore, the reinforcing part 3 has such fire retardant properties that the seat cushion complies with safety regulations for aircrafts. This means that the seat cushion according to the invention has properties that provide the seat cushion with a high fire resistance to prevent a possible fire from spreading quickly. The lower surface 3b of the reinforcing part 3 may be adapted to cooperate with a seat frame (not shown) of an aircraft seat. Specific connecting means to connect the seat cushion 1 to the seat frame may be provided. The connecting means may be designed in various manners and comprise for instance suitable screw connections, snap connections, riveted connections, elastic connections, button connections, hook connections, Velcro and/or the like. In a different embodiment (not shown) it is also possible that the reinforcing part 3 is part of a seat frame and the seat part 2 forms the seat cushion 1.

Furthermore, the reinforcing part 3 may be manufactured with other methods than molding, for instance by means of a slab-stock process and subsequently be cut to obtain the desired shape.

Figure 4:
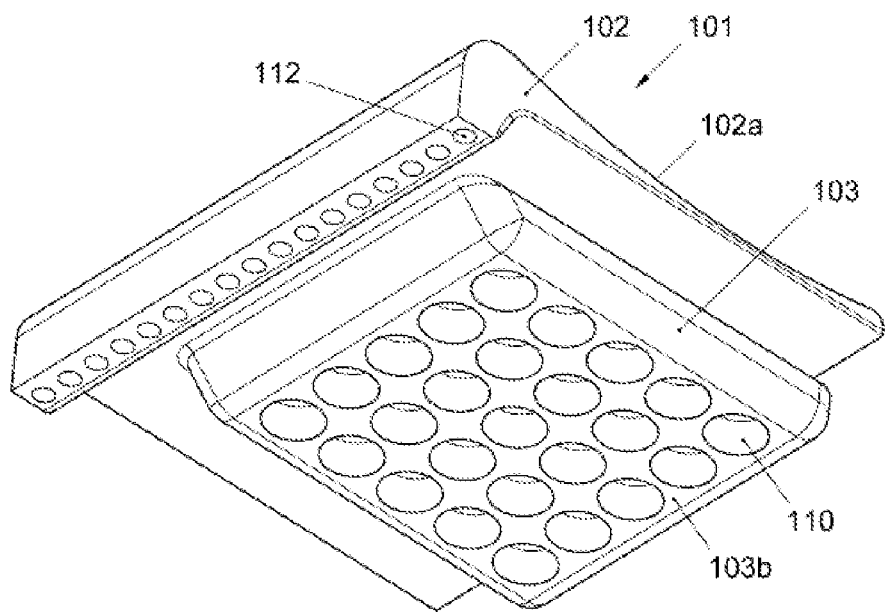
FIG. 4 schematically shows a perspective view of a second embodiment of the seat cushion according to the invention.
Figure 5:
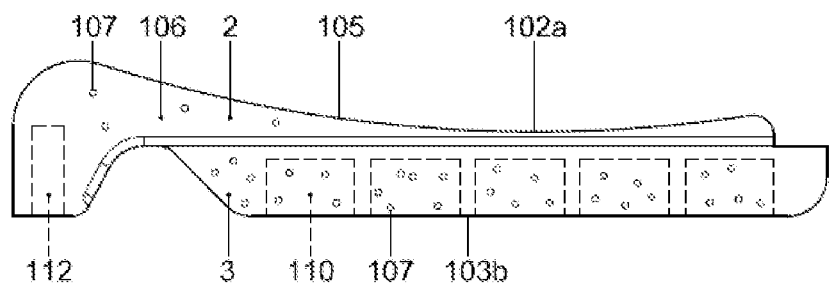
FIG. 5 schematically shows a cross sectional side view of the second embodiment of the seat cushion as shown in FIG. 4.

In FIGS. 4 and 5 a further embodiment of the seat cushion 101 according to the invention is shown. Elements that are similar to elements described with the first embodiment are not described again. Therefore, reference is made to the above description relating to the first embodiment.

The seat cushion 101 comprises a seat part 102 and a reinforcing part 103, wherein both parts 102, 103 are integrally formed in one piece 105 out of a base material 106 that encloses expanded polypropylene particles 107 (see for instance FIG. 5) having fire retardant properties. The particles 107 may be formed out of a polypropylene raw material having fire retardant properties. The particles 107 may have different dimensions, for instance having a diameter of between 100 nanometer-15 mm, preferably between 2-5 mm, for instance 3-4 mm Thus, the particles 107 may have a dimension in the range of a few nano- or micrometer to a few millimeters.

The particles 107 may be distributed regularly or irregularly through the base material 106. As is visible in FIG. 5, the particles 107 are distributed irregularly through the base material 106. The seat cushion 1 may comprise 1%-50% particles with respect to the total amount of material of the seat cushion 1. The integrated seat part and reinforcing part 105 may be manufactured by means of a molding process. Therefore, a material mixture comprising base material 106 and an amount of particles 107 is inserted in a mold cavity having a shape corresponding to the outer surfaces of the integrated part 105. During the molding process, the particles 107 may displace with respect to the base material 106 due to a difference in relative density before hardening of the material mixture inside the mold cavity. Applicants found that the way of distribution of the particles 107 in the base material 106 does not have a significant influence with regard to the properties of the molded product 105. For instance, the strength of the seat cushion 101 will be as desired regardless of the distribution pattern of the particles seen in cross sectional view.

The seat cushion 101 as shown in FIGS. 4 and 5 provides a high strength to weight ratio, a desired impact absorption and a comfortable seating surface. The latter property may be influenced by the kind of base material 106 used. The base material 106 may for instance be a resilient polymer such as a polyurethane (PU) foam, such as a HR PU foam, a graphite foam, bonded foam or the like material. The strength of the cushion 101 may mostly be determined by the EPP particles provided inside the base material 106. Furthermore, the seat cushion 101 has a relatively low density (for instance compared to the density of water) such that the seat cushion 101 has floating capacities. Consequently, also the second embodiment of the seat cushion according to the invention may be used as a floating device.

Since the seat part 102 and the reinforcing part 103 are integrally formed in one piece, the manufacturing process thereof may be easy and economically attractive due to the small amount of separate components and the limited process steps needed.

In order to reduce weight of the seat cushion 101 it may comprise cavities 110, 112, similarly as described with the first embodiment of the seat cushion 1 according to the invention. The first cavities 110 extend from a lower surface 103b of the integrated seat and reinforcing part 105 towards the upper receiving surface 102a of said part 105. The upper receiving surface 102a may comprise an ergonomically designed shape to provide a comfortable support for a user. Instead of molding the seat cushion 101, this cushion may instead be manufactured using a slab-stock process.

Although illustrative embodiments of the present invention have been described above, in part with reference to the accompanying drawings, it is to be understood that the invention is not limited to these embodiments. Variations to the disclosed embodiments can be understood and effected by those skilled in the art in practicing the claimed invention, from a study of the drawings, the disclosure, and the appended claims. It will be clear, for example, that the seat cushion may have different shapes and dimensions dependent on the use thereof. Furthermore, the seat cushion, for instance the lower surface of the reinforcing part, may be adapted to cooperate with a seat frame onto which the seat cushion may be mounted. Besides, the seat cushion may comprise a different amount of cavities provided at different locations inside the reinforcing part of the seat cushion. The cavities may have different shapes and different dimensions.

In addition, the seat cushion may, for instance, be used in various types of seat apparatuses, for instance chairs, couches and/or armchairs, and for, for instance, seat apparatuses in aircraft, vessels and/or vehicles, in particular trains, automobiles and the like.

Reference throughout this specification to "one embodiment" or "an embodiment" means that a particular feature, structure or characteristic described in connection with the embodiment is included in at least one embodiment in the present invention. Thus, the appearances of the phrases "in one embodiment" or "in an embodiment" in various places throughout this specification are not necessarily all referring to the same embodiment. Furthermore, it is noted that particular features, structures or characteristics of one or more embodiments may be combined in any suitable manner to form new, not explicitly described embodiments.

The invention claimed is:

1. A seat cushion comprising a seat part having a receiving surface adapted to receive a user and a reinforcing part supporting the seat part wherein the seat part and the reinforcing part are formed from polyurethane foam in which fire retardant, expanded polypropylene particles are embedded, wherein when said seat cushion catches fired and is subsequently removed from the fire, the seat cushion self-extinguishes due to the fire retardant properties of the expanded polypropylene particles embedded therein.

2. The seat cushion of claim 1, wherein the seat part and the reinforcing part are integrally formed in a discrete element.

3. The seat cushion of claim 1, wherein the particles have a diameter of approximately 100 nanometer-15 mm.

4. The seat cushion of claim 1, wherein the particles are distributed irregularly through the polyurethane foam.

5. The seat cushion of claim 1, wherein the particles in the cushion constitute 1%-50% of the total amount of material of the seat cushion.

6. The seat cushion of claim 1, wherein the reinforcing part comprises an array of hollow cavities.

7. The seat cushion of claim 6 wherein the array of cavities extends from the lower surface of the reinforcing part in a direction towards the seat part.

8. A method for manufacturing the seat cushion of claim 1, which method comprises forming the seat cushion by a foaming process from a polyurethane foam reactive mixture containing said fire retardant polypropylene particles.

9. The method of claim 8, wherein the polyurethane foam reactive mixture and the particles are processed at the same time.

10. The method of claim 9, wherein the reinforcing part and the seat part are integrally formed as a discrete element in the same process step.

11. The method of claim 9 wherein the polyurethane reactive foam mixture and particles are inserted in a mold cavity or dispensed on a moving conveyor belt.

12. The method of claim 8, wherein during forming of the reinforcing part an array of cavities is provided in the reinforcing part.

13. The method of claim 12 wherein the array of cavities extends from a lower surface of the reinforcing part in a direction towards the seat part.

14. A seat provided with the seat cushion of claim 1.

15. The seat of claim 14, wherein the seat comprises a frame, wherein the reinforcing part is coupled to the frame and wherein the seat part is removably provided onto the frame containing said reinforcing part.

16. A vehicle, vessel or aircraft, provided with the seat of claim 14.

17. The seat cushion of claim 1 which is for an aircraft seat.

* * * * *